(12) United States Patent  (10) Patent No.: US 8,307,487 B2
    Dairon et al.  (45) Date of Patent: Nov. 13, 2012

(54) CLEANING DEVICE FOR CLEANING TURF

(75) Inventors: Michel Maurice Dairon, Pruille l'Eguille (FR); Jose Alain Loyer, Mansigne (FR)

(73) Assignee: SAS Dairon, Mulsanne (FR)

( * ) Notice: Subject to any disclaimer, the term of this patent is extended or adjusted under 35 U.S.C. 154(b) by 243 days.

(21) Appl. No.: 12/672,075

(22) PCT Filed: Sep. 5, 2008

(86) PCT No.: PCT/FR2008/051589
    § 371 (c)(1),
    (2), (4) Date: Feb. 4, 2010

(87) PCT Pub. No.: WO2009/044055
    PCT Pub. Date: Apr. 9, 2009

(65) Prior Publication Data
    US 2011/0247152 A1  Oct. 13, 2011

(30) Foreign Application Priority Data
    Sep. 7, 2007 (FR) ...................................... 07 57429

(51) Int. Cl.
    *A46B 13/00*  (2006.01)

(52) U.S. Cl. ................ 15/21.1; 15/79.1; 15/79.2; 15/83; 15/84; 15/86

(58) Field of Classification Search ............. 15/83, 22.1; A46B 13/00
    See application file for complete search history.

(56) References Cited

U.S. PATENT DOCUMENTS

| 3,513,498 | A | * | 5/1970 | Bennich | 15/84 |
| 4,914,774 | A | * | 4/1990 | Sheehan et al. | 15/5 |
| 5,742,968 | A | * | 4/1998 | Nicholson | 15/83 |
| 2011/0010879 | A1 | * | 1/2011 | Dairon et al. | 15/105 |

FOREIGN PATENT DOCUMENTS

GB  2 276 803 A  10/1984

\* cited by examiner

*Primary Examiner* — Monica Carter
*Assistant Examiner* — Stephanie N Berry
(74) *Attorney, Agent, or Firm* — Leydig, Voit & Mayer, Ltd.

(57) ABSTRACT

The invention relates to a cleaning device particularly for grassed areas. The cleaning device includes a cylindrical brush in contact with a rear roller to clean the roller. The brush can be adjusted to a working height relative to the chassis of the device, along an arcuate path having a center situated on the longitudinal axis of the roller.

19 Claims, 7 Drawing Sheets

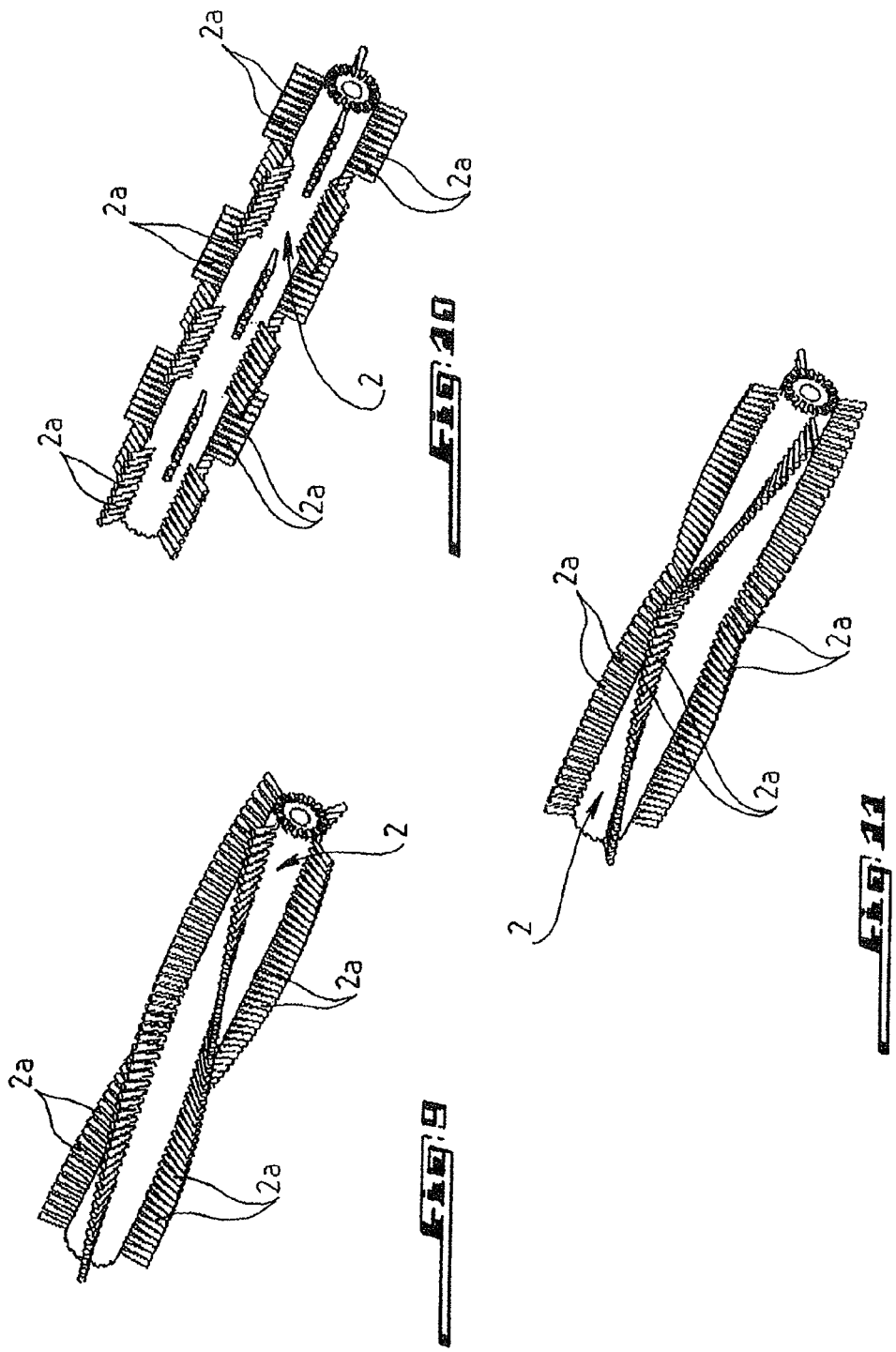

CLEANING DEVICE FOR CLEANING TURF

FIELD OF THE INVENTION

The present invention relates to a cleaning device notably for a turfed area. The invention finds application in the field of green spaces, such as golf courses, football pitches, or other fields.

BACKGROUND OF THE INVENTION

FIGS. 1-3 schematically illustrate a known device for cleaning a turfed area.

This device comprises a chassis, not shown, on which are positioned, relative to the working or moving direction of the device, symbolized by the arrow F, a rear roller 1, which may roll on the turfed area, and a front cylindrical brush 2 parallel to the roller, the latter and the cylindrical brush 2 being positioned transverse to the working direction F of the device.

The cylindrical brush 2 is driven by a hydraulic, electric or other motor, not shown, driving the brush in the opposite direction to the rotation of the roller 1. Thus, the cylindrical brush 2 allows collection of debris D present on the turfed area in front of the brush and their projection into a rear recovery or collecting bin 3 secured to the chassis of the device.

Such a device may be hitched to the rear of a tractor-drawn ground working machine, such as a machine for dethatching or coring the ground.

However, this known device has the drawback that the debris left behind the ground working machine is not all projected by the cylindrical brush 2 into the recovery bin 3, and debris escaping from the action of the cylindrical brush 2, reach the rear roller as illustrated in FIG. 2 and accumulate around the roller and form a layer increasing the diameter of the roller 1 all along the forward movement of the device, as illustrated in FIG. 3.

This accumulation of debris around the rear roller 1 perturbs proper picking-up of the debris by the cylindrical brush 2 because the latter has a height adjusted relative to the ground which increases gradually as the diameter of the rear roller 1 increases, a height which may be such that the cylindrical brush no longer acts on the turfed area and can no longer recover the debris for transferring it into the recovery bin 3.

In order to solve this problem, attempts were made to use a scraping tool 4, such as a blade, for cleaning the rear roller 1 during the movement of the device, but such a solution has the drawback that the debris or residue detached from the roller 1 by the scraping tool 4 fall behind the roller thereby leaving residue on the ground.

SUMMARY OF THE INVENTION

The object of the present invention is to overcome the above drawbacks of known devices for cleaning a turfed area.

For this purpose, the invention provides a device for cleaning a turfed area, comprising a chassis on which are positioned a rear roller, which may roll on the turfed area, and a front cylindrical brush parallel to the roller, mounted to rotate in the opposite direction to the rotation of the roller, and with which debris present on the turfed area may be picked up in order to project it into a recovery bin secured to the chassis, and which is characterized in that the cylindrical brush is in contact with the rear roller in order to clean the latter and may be adjusted to a working height relative to the chassis according to an arc path, the centre of which is located on the longitudinal axis of the rear roller.

Advantageously, the chassis comprises two rigid side flanges between which the rear roller is rotatably mounted and a plate adjacent to each side flange, which may pivot under the action of at least one adjustment means, relative to the side flange around the longitudinal axis of the rear roller to a position of adjustment of the cylindrical brush to its working height at which the adjacent plate is attached to the side flange, both adjacent plates supporting together the cylindrical brush in front of the rear roller.

The cylindrical brush is driven by a motor, such as an electric or hydraulic motor, secured to one of the plates supporting this brush, outside this plate and in front of the rear roller.

The adjustment means comprises a screw passing through a sheath connected to the supporting plate of the cylindrical brush and the end of which bears upon an abutment portion secured to the corresponding side flange.

The sheath is secured to an external plate adjacent to the corresponding flange opposite the internal supporting plate of the cylindrical brush and connected to the internal supporting plate by the fixing bolt passing through a bore of the external plate.

The external plate includes graduations which may face a fixed mark of the corresponding flange in order to indicate the working height of the cylindrical brush.

Each supporting plate of the cylindrical brush is attached by two screws to two bearing supports of the corresponding end of the rear roller; the heads of the fixing screws are respectively housed in two arched lumens of the corresponding side flange concentric with the longitudinal axis of the rear roller.

The bearing support is pivotally mounted in the corresponding flange with a bushing secured to this support.

The device comprises two means for respectively pivoting and adjusting both supporting plates of the cylindrical brush.

The rear roller and the cylindrical brush extend transverse to the working direction of the device which is hitched to the rear of a drawing tractor or of a machine for dethatching or coring the ground, itself hitched to the rear of a drawing tractor.

BRIEF DESCRIPTION OF THE DRAWING FIGURES

The invention will be better understood, and other objects, characteristics, details and advantages thereof will become more clearly apparent in the explanatory description which follows, made with reference to the appended drawings only given as an example illustrating an embodiment of the invention and wherein:

FIGS. 1-3 schematically illustrate a device from the prior art for cleaning turfed areas;

FIG. 4 schematically illustrates, in a side view, a device for cleaning a turfed area according to the invention;

FIGS. 9-11 illustrate alternative configurations of the bristles of a brush of the device of the invention.

DETAILED DESCRIPTION

Figure 1:
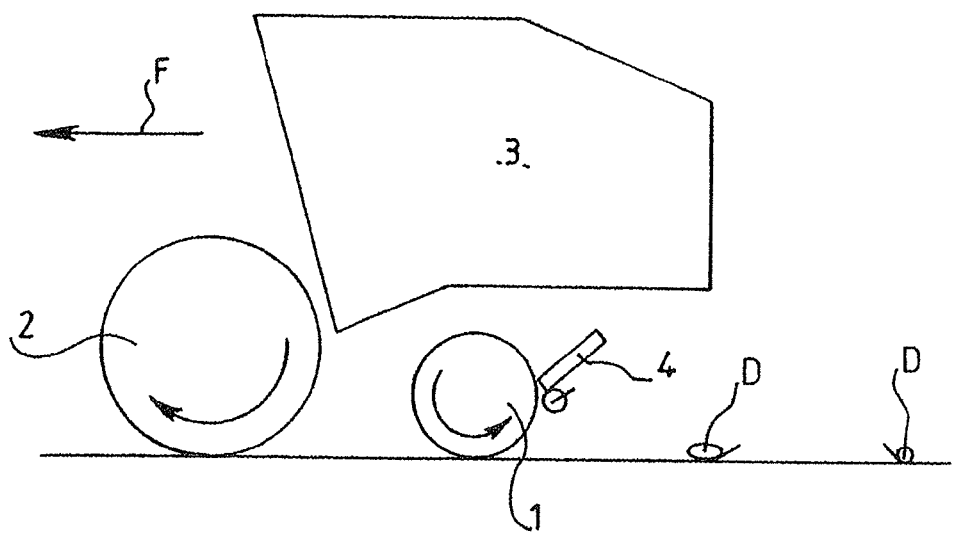
Figures 2, 3:
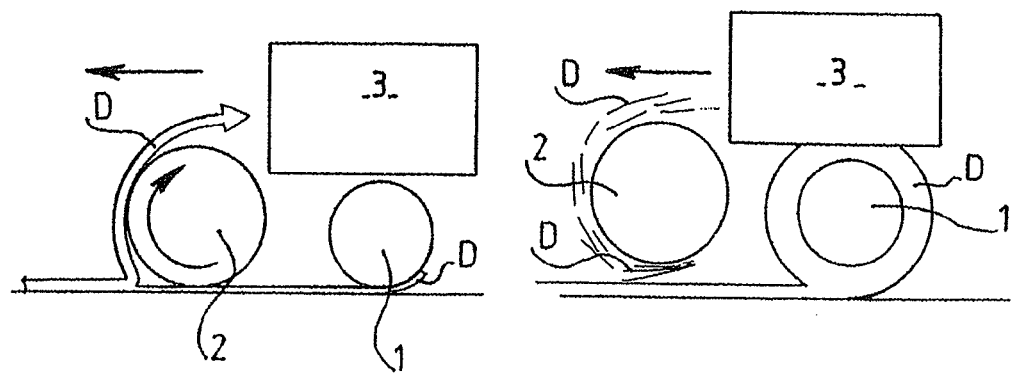
Figure 4:
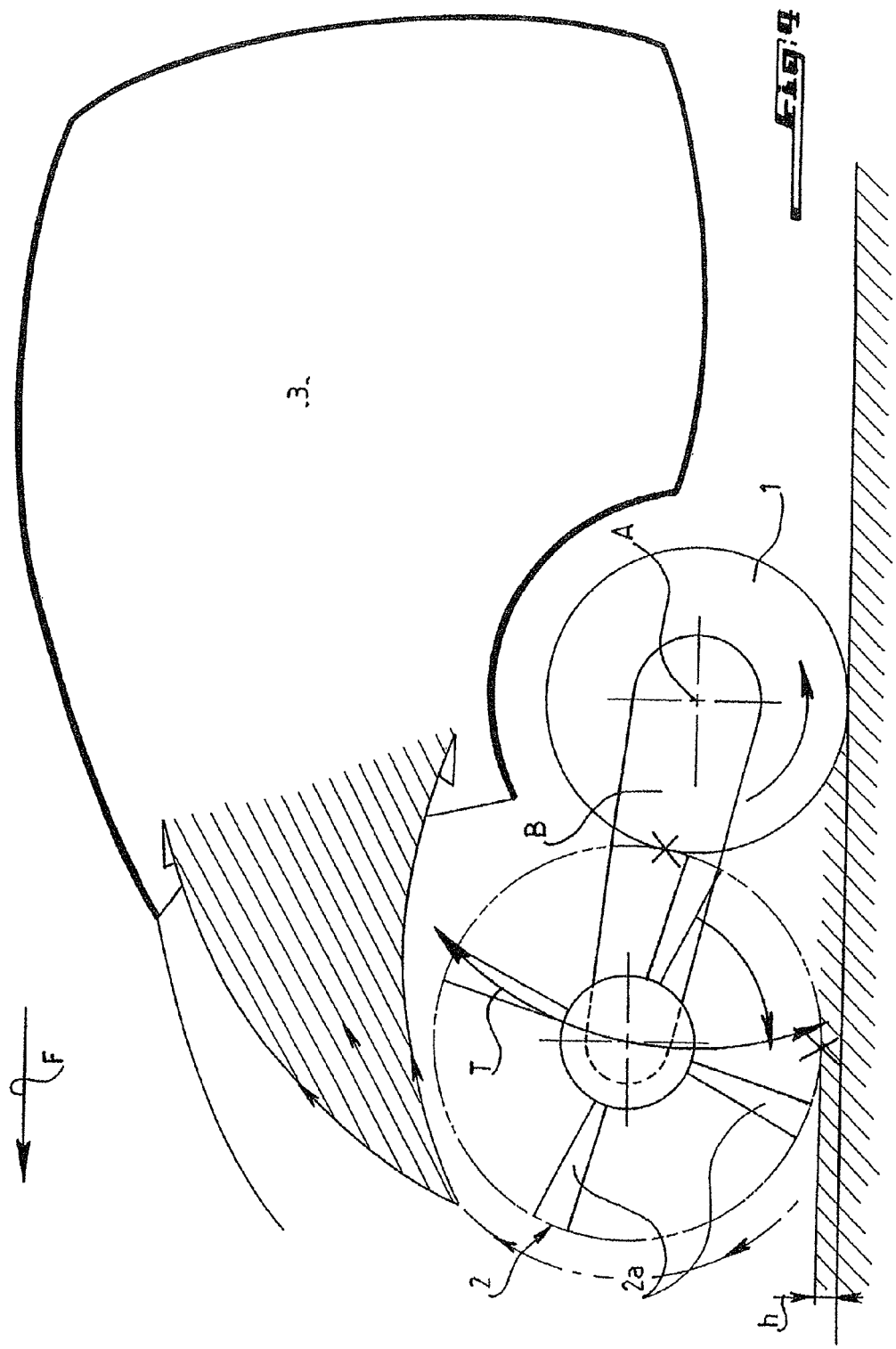
Figure 5:
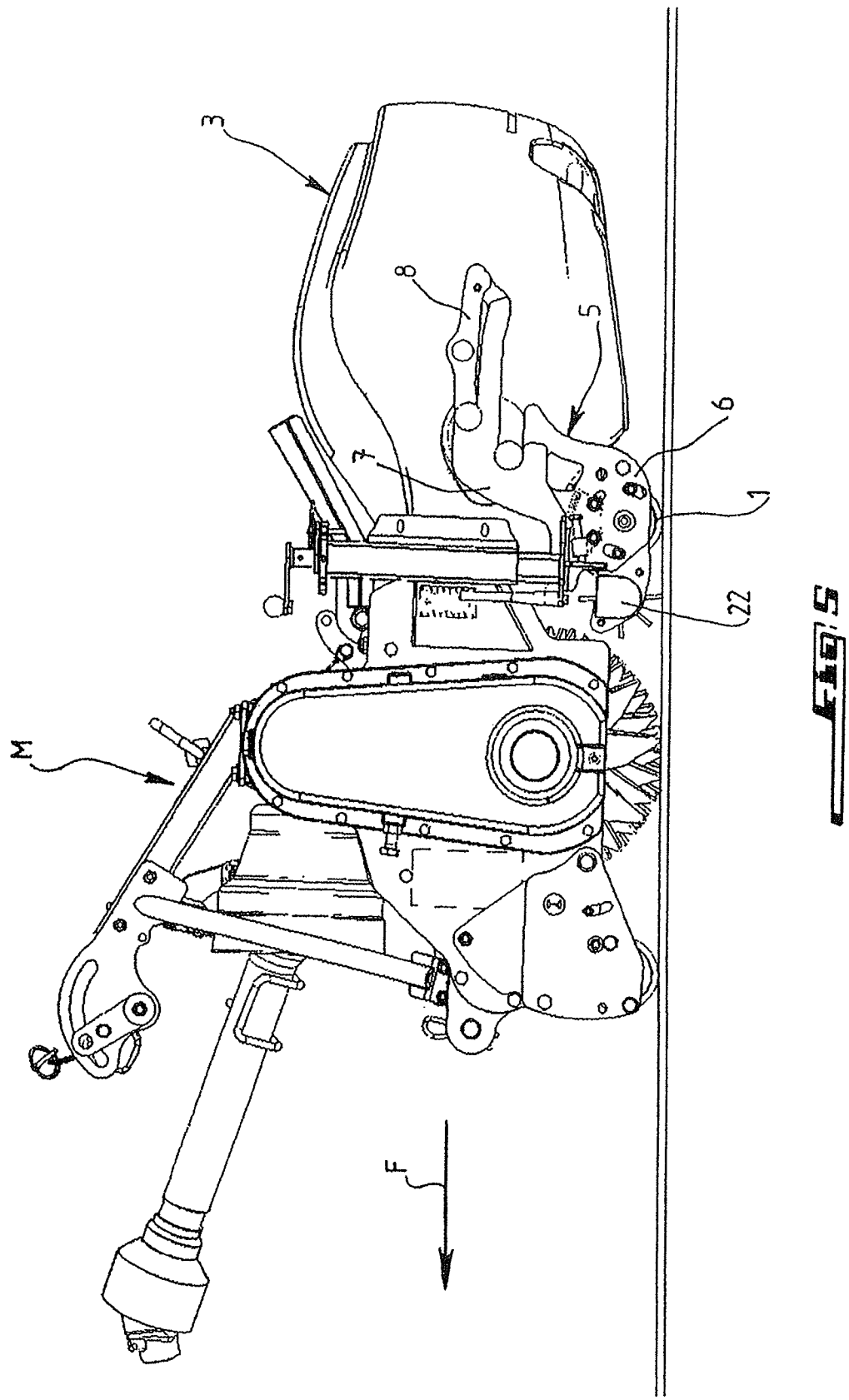
FIG. 5 is a side view of the cleaning device of the invention hitched to a machine for de-thatching the ground.

FIG. 4 schematically illustrates a device according to the invention with which in particular turfed areas may be cleaned.

This device comprises a chassis, which will be specifically defined in FIGS. 5-8, on which are positioned a roller 1 located rearwards relative to the forward movement or working direction F of the device and which may roll on the turfed area in order to be used as a ground support for the device, and a front cylindrical brush 2 parallel to the roller 1 while extending transverse to the forward movement direction F of the device.

The cylindrical brush 2 is rotatably mounted on the chassis to rotate in the opposite direction to the rotation of the roller 1. This brush allows debris present on the turfed area to be picked up in order to project it rearwards with centrifugal force into a bin for recovering or picking up debris 3, secured to the chassis. In an alternative not shown, the debris may be projected on a conveyor belt, which deposits the debris in a trailer of a tractor, following the device of the invention.

According to the invention, the cylindrical brush 2 is in contact with the rear roller 1 in order to continuously clean the latter and may be adjusted to a working height h relative to the chassis and, therefore to the ground, following an arc path, the centre A of which is located on the longitudinal axis of the rear roller 1.

FIG. 4 schematically shows the connection between each of the ends of the cylindrical brush 2 and of the rear roller 1 by means of an arm or a pivoting plate B allowing the brush 2 to pivot around the longitudinal axis of the roller 1 upwards or downwards upon adjusting the brush to its working height h. This working height depends on the height relative to the ground of the grass to be cleaned so that the bristles 2a of the brush may penetrate into the grass without touching the ground.

In operation, the cylindrical brush 2, by brushing, picks up the debris present in the grass in front of the brush in order to project it upwards and rearwards into the recovery bin 3 and, at the same time, the brush 2 permanently cleans the rear roller 1 in order to avoid any deposit of debris on the perimeter of this roller, thereby optimizing the picking-up of debris because the working height of the brush relative to the ground is maintained constant.

FIGS. 5-8 illustrate a preferred embodiment of the cleaning device of the invention, the operating principle of which corresponding to that of the cleaning device described in FIG. 4.

The cleaning device of FIGS. 5-8 will be described as being hitched to the rear of a machine M for dethatching the ground, itself hitched to the rear of a drawing tractor, not shown, but it is well understood that this device may be hitched to the rear of any other ground working machine, such as, for example, a machine for coring the ground, or quite simply to the rear of a drawing tractor with a standard three point attachment.

The cleaning device comprises a chassis 5 comprising two rigid side flanges 6 positioned parallel to the forward movement direction F of the assembly formed by the machine M and the cleaning device and which are respectively attached to the internal faces of two sidewalls 7 secured to the chassis of the machine M behind the latter.

Each of the two flanges 6 includes at its upper portion a rigid arm 8 extending rearwards from this flange. The recovery bin 3 is removably attached to two rear arms 8 of the chassis 5.

The rear roller 1 is mounted to freely rotate between both side flanges 6. More specifically, each of the ends of this roller is rotatably mounted in at least one bearing of the ball or needle type, not shown, attached in a bearing support 9 as a substantially lozenge-shaped plate attached by two fixing screws 10 to the internal face of a supporting plate 11 of the front cylindrical brush 2 and which may pivot around the longitudinal axis Y-Y' of the roller 1 as this will be seen later on.

The heads 12 of both screws 10 for attaching the bearing support 9 to the supporting plate 11 of the cylindrical brush 2 are respectively housed in two arched lumens 13 made through each rigid flange 6. Both arched lumens 13 have their centre of radius of curvature located on the longitudinal axis Y-Y' of the roller 1 extending perpendicularly to the flanges 6 and are symmetrical to this axis.

Each bearing support 9 includes a bushing 14 coaxial with the longitudinal axis Y-Y' of the roller 1, passing through the supporting plate 11 of the roller 2 and the corresponding flange 6 so that the assembly formed by the bearing support 9 and the plate 11 may rotate, by a determined angular value, relative to the flange 6 around the longitudinal axis Y-Y' upon adjusting the working height of the cylindrical brush 2.

Each of the supporting plates 11 of the cylindrical brush 2 is normally attached to the corresponding flange 6 via two fixing bolts 15, respectively, passing through two bores of the plate 11 and two arched lumens 16 made through the corresponding flange 6, both lumens 16 being located on the same circumference and with a centre of a radius of curvature located on the axis Y-Y' of the roller 1.

A plate 17 is attached to the external face of each flange 6 opposite the internal face of this flange on which the corresponding plate 11 for supporting the cylindrical brush 2 is attached by two bolts 15, the screws of which respectively pass through two bores of the plate 17 which may therefore be blocked with the plate 11 to the flange 6 by tightening the nuts 18 of the bolts 15, in a determined position of two arched lumens 16.

A means 19 is attached to each of the plates 17 and allows adjustment of the working height of the cylindrical brush 2.

Each adjustment means 19 comprises an internally tapped sheath 20, attached for example by welding, to the external face of the corresponding plate 17, and a screw 21 passing through the sheath 20 and the end of which, opposite its head 22, bears upon an abutment plate 23 secured to the flange 6 or to the chassis 5 of the cleaning device.

Each plate 17 comprises a plurality of graduations 24 consisting of small windows which may be selectively brought to face a fixed mark R secured to the external face of the corresponding flange 6 so as to indicate the working height of the cylindrical brush 2.

Both plates 11 include two parallel arms 11a extending in front of the roller 1 towards the machine M and between which is rotatably mounted the cylindrical brush 2 which is thus positioned between the roller 1 and a roller 26 for supporting blades 27 for dethatching the ground, of the machine M.

The cylindrical brush 2 is driven into rotation by an electric or hydraulic motor 28 attached to the external face of one of the arms 11a for supporting the brush 2 coaxially to the longitudinal axis of the latter to drive the brush 2 in the direction of rotation opposite to that of the roller 1 during the movement of the machine M in the F direction.

A cylindrical bar 29 may be attached between both flanges 6 behind the roller 1 in order to ensure their stiffening.

The adjustment of the working height of the cylindrical brush 2 already emerges from the preceding description and will now be explained.

The operator first of all loosens both nuts 18 of the fixing bolts 15 and then by means of a wrench acts on each screw 21 head 22 in order to drive each of the screws 21 in one direction or in the other in order to move the screws of the bolts 15 in their respective curvilinear lumens 16 in the corresponding direction in order to simultaneously displace each plate 17 and each plate 11 supporting the cylindrical brush 2 around the longitudinal axis Y-Y' of the roller 1. In this way, the cylindrical brush 2 is displaced relative to the flanges 6 and, therefore, relative to the roller 1, following a curved trajectory symbolized by the double arrow T in FIG. 7 and with a centre located on the Y-Y' axis of the roller 1.

It should be noted that during the pivoting of the cylindrical brush 2 around the Y-Y' axis, the heads 12 of the fixing screws 10 move in their respective curvilinear lumens 13 of the flanges 6 with concomitant pivoting of the bearing supports 9 relative to the flanges 6 via the bushings 14.

The pivoting of the cylindrical brush 2 around the axis Y-Y' therefore allows positioning of this brush at a working height depending on the height of the grass to be cleaned.

Once this adjustment has been carried out with visual indication of the working height of the brush 2 by the graduations 24, the operator again tightens both nuts 18 in order to block the pairs of plates 17, 11 to their respective flanges 6 and, consequently, to block the cylindrical brush 2 at its working height.

By pivoting the cylindrical brush 2 around the axis Y-Y' of the roller 1, it is possible to maintain constant the distance or friction pressure of the bristles of the brush 2 on the roller 1 for cleaning the latter.

The cleaning device of the invention allows both cleaning of the ground and of the following roller, and the debris removed from the roller 1 by the bristles of the brush 2 may be almost completely transported by the brush 2 into the recovery bin 3, thereby avoiding the presence of debris behind the roller 1. Further, the adjustment of the working height of the cylindrical brush is extremely simple and may be carried out very easily.

Figure 6:
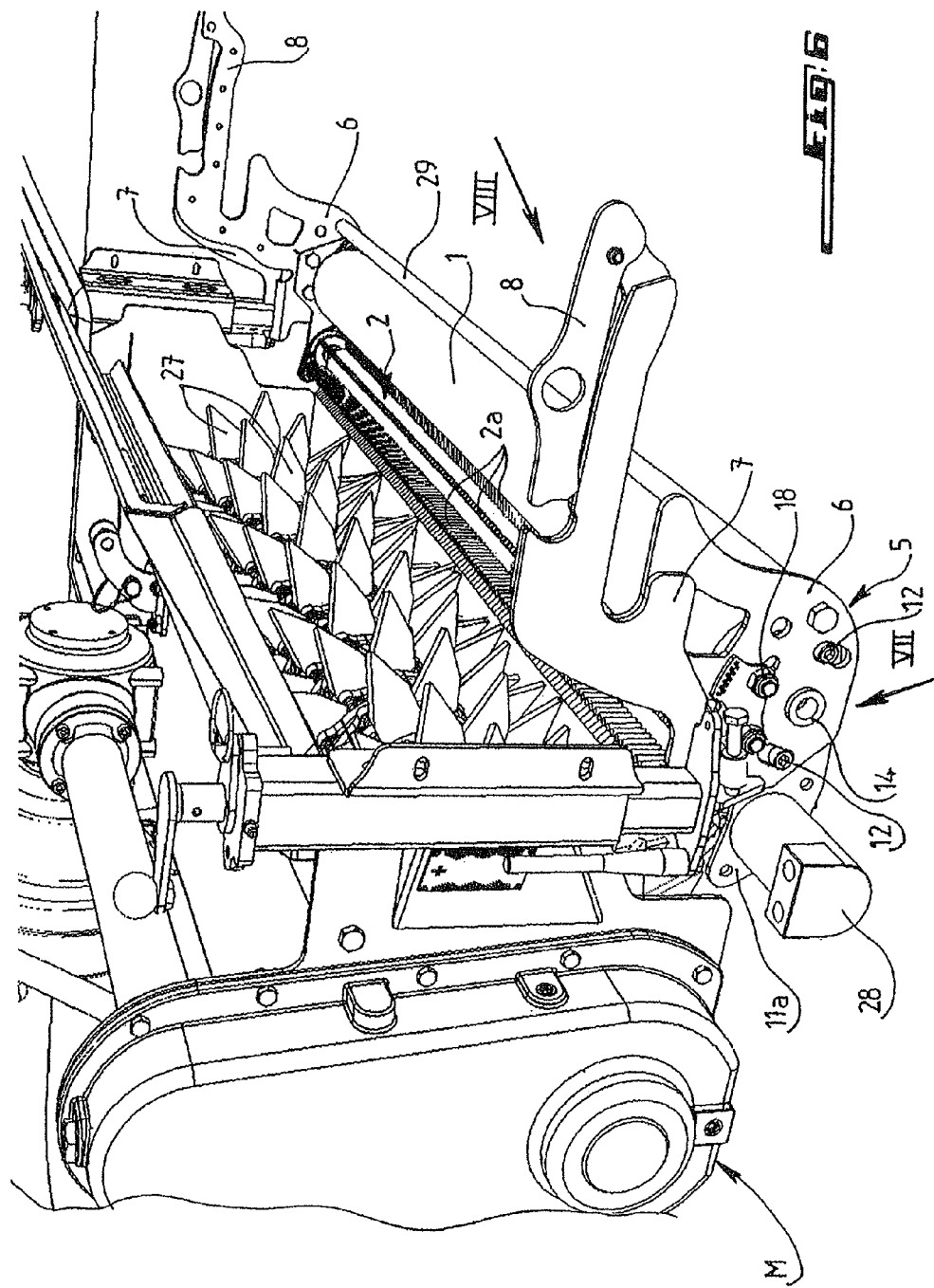
FIG. 6 is a rear perspective view of three quarters of the assembly of FIG. 5 without the recovery bin of the cleaning device.
Figure 7:
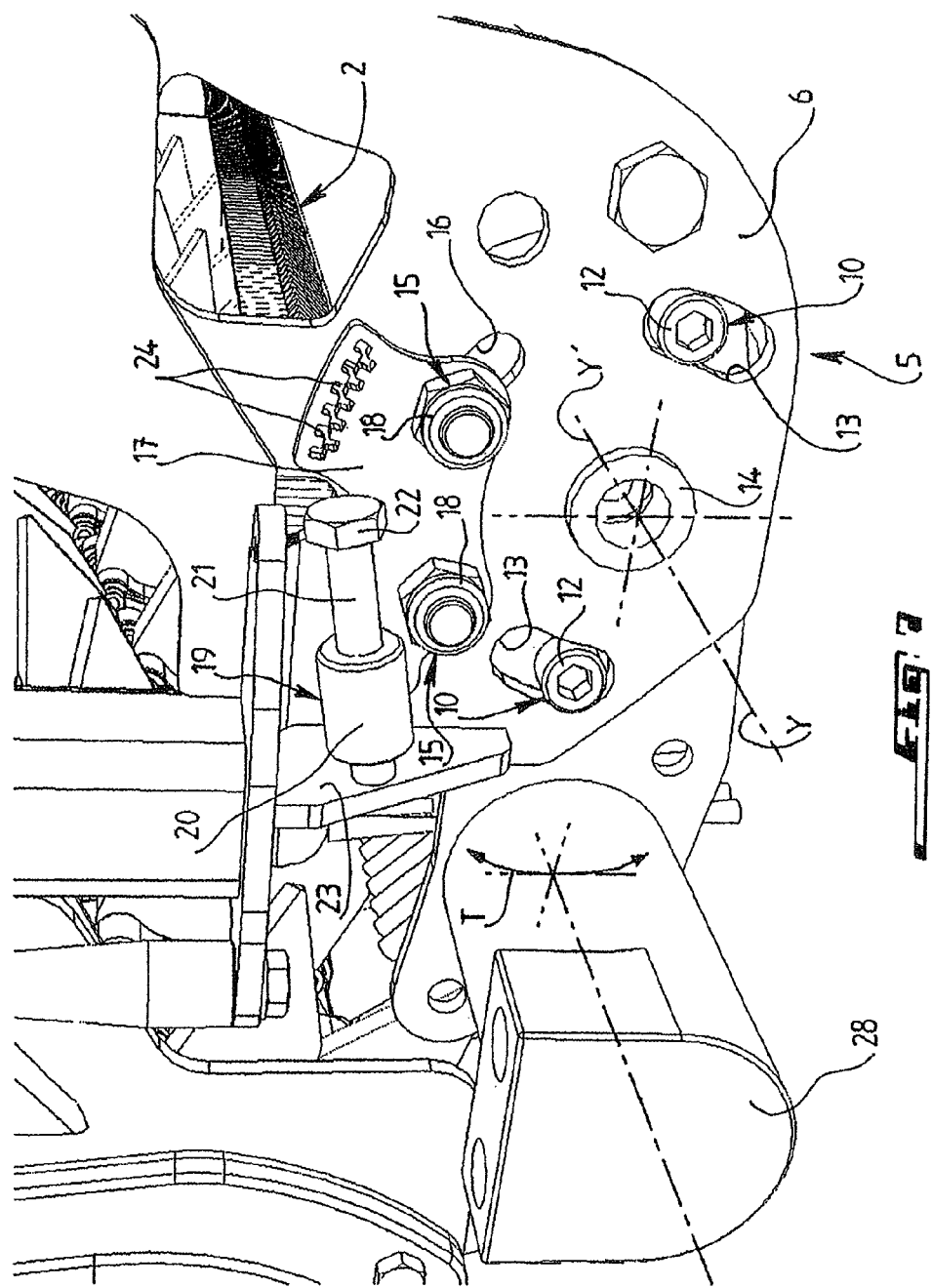
FIG. 7 is an enlarged side view along the arrow VII of FIG. 6.
Figure 8:
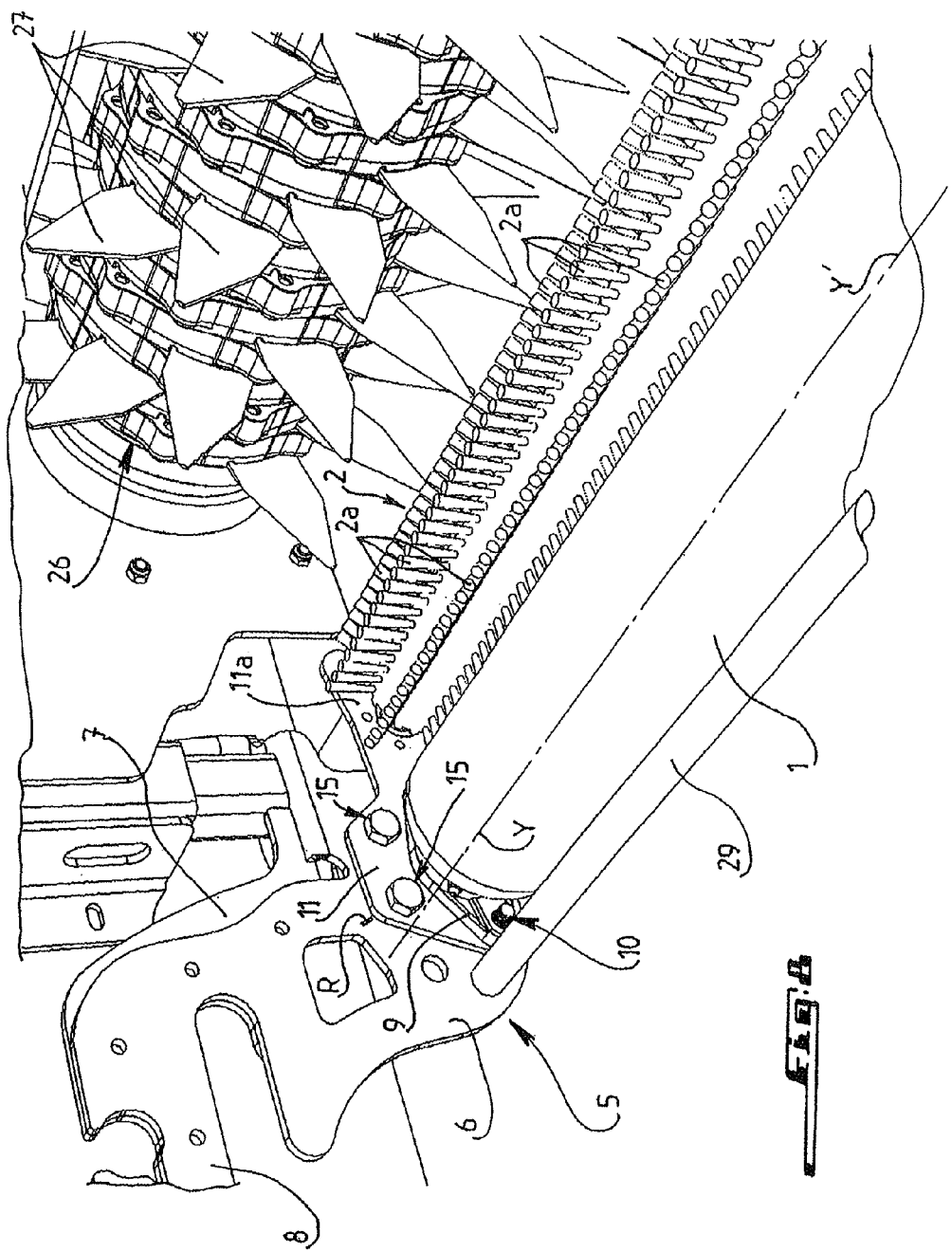
FIG. 8 is a partial perspective view along the arrow VIII of FIG. 6.

The bristles 2a of the cylindrical brush 2 instead of being positioned in-line as illustrated in FIGS. 6 and 7, may consist of several circular portions parallel to each other along the longitudinal axis of the cylinder or be helically positioned along this cylinder as illustrated in FIG. 9. FIG. 10 shows that the bristles 2a of the brush 2 consist of sections of in-line bristles alternately positioned along the brush 2, i.e. angularly shifted regularly along the latter. According to FIG. 11, the bristles 2a of the brush 2 are positioned forming a herringbone pattern.

The invention claimed is:

1. A device for cleaning a turfed area, the device comprising:
    a chassis on which are positioned, relative to a forward direction of the device, a recovery bin;
    a rear roller having a longitudinal axis and which may roll on the turfed area; and
    a front cylindrical brush parallel to the rear roller, mounted to rotate in an opposite direction of rotation from rotation of the roller and with which debris present on the turfed area may be picked up and projected into the recovery bin secured to the chassis, wherein the cylindrical brush is in contact with the rear roller for cleaning the rear roller and may be adjusted to a working height relative to the chassis, following an arcuate path that has a center located on the longitudinal axis of the rear roller.

2. The device according to claim 1, wherein the chassis comprises: two rigid side flanges, between which the rear roller is rotatably mounted, and respective supporting plates, adjacent to each side flange, which may pivot, under action of at least one adjustment means, relative to the side flange, around the longitudinal axis of the rear roller to a position for adjusting the front cylindrical brush to a working height at which the adjacent supporting plate is attached to the corresponding side flange, both supporting plates supporting, together, the front cylindrical brush in front of the rear roller.

3. The device according to claim 2, including a motor driving the front cylindrical brush, the motor being secured to a first of the supporting plates supporting the front cylindrical brush, outside the first supporting plate and in front of the rear roller.

4. The device according to claim 2, including means for attaching each supporting plate supporting the front cylindrical brush to the corresponding side flange, the means for attaching comprising at least one bolt passing through a bore of the supporting plate and an arched lumen of the side flange, concentric with the longitudinal axis of the rear roller.

5. The device according to claim 4, wherein the adjustment means comprises a screw passing through a sheath connected to the supporting plate supporting the front cylindrical brush, an end of which bears upon an abutment portion secured to the corresponding side flange.

6. The device according to claim 5, wherein the sheath is secured to an external plate adjacent to the corresponding side flange, opposite the supporting plate supporting the front cylindrical brush and connected to the supporting plate by the bolt passing through a bore of the external plate.

7. The device according to claim 6, wherein the external plate includes graduations which may face a fixed mark of the corresponding side flange to indicate the working height of the front cylindrical brush.

8. The device according to claim 2, wherein each supporting plate for supporting the front cylindrical brush is attached by two screws to a bearing support of a corresponding end of the rear roller, and heads of the two screws are respectively housed in two arched lumens of the corresponding side flange, concentric with the longitudinal axis of the rear roller.

9. The device according to claim 8, wherein the bearing support is pivotally mounted in the corresponding side flange by a bushing secured to the bearing support.

10. The device according to claim 2, comprising two means for respectively pivoting and adjusting both supporting plates for supporting the front cylindrical brush.

11. The device according to claim 1, wherein the rear roller and the front cylindrical brush extend transverse to a working direction of the device.

12. The device according to claim 1, hitched to a machine for de-thatching or coring the ground.

13. The device according to claim 3, wherein the motor and the front cylindrical brush have respective longitudinal axes that are coaxial.

14. A device for cleaning a surface, the device comprising:
    a chassis;
    a recovery bin located on the chassis for collecting debris removed from the surface by the device;
    a roller mounted on the chassis, that rotates with respect to the chassis, rolls on the surface cleaned, and supports the chassis and the recovery bin above the surface cleaned, the roller having a longitudinal axis extending transverse to a working direction of the device, when the device moves across and cleans the surface, and about which the roller rotates in rolling on the surface cleaned;
    a cylindrical brush having a longitudinal axis parallel to the longitudinal axis of the roller, mounted on the chassis, and contacting the roller, wherein the roller and the cylindrical brush rotate in opposite directions when the roller rolls on the surface, and the cylindrical brush contacts the roller and cleans debris from the roller as the roller rotates about the longitudinal axis of the roller and the cylindrical brush rotates about the longitudinal axis of the cylindrical brush; and a height adjustment structure on the chassis for adjusting height of the cylindrical brush relative to the chassis and the surface cleaned, the height being adjusted along an arcuate path that has a center of curvature located on the longitudinal axis of the roller so that contact between the cylindrical brush and the roller is maintained as the height of the cylindrical brush is adjusted.

15. The device according to claim 14, wherein the height adjustment structure comprises:

first and second rigid side flanges, the roller being rotatably mounted between the first and second rigid side flanges; and first and second support plates pivotally mounted adjacent the first and second rigid side flanges, respectively, and pivoting around the longitudinal axis of the roller for adjusting the height of the cylindrical brush while maintaining contact between the cylindrical brush and the roller.

16. The device according to claim 15, wherein the first and second side flanges include an arcuate slot that has the center of curvature located on the longitudinal axis of the roller.

17. The device according to claim 15, comprising a motor rotating the cylindrical brush, wherein the motor is secured to the first support plate.

18. The device according to claim 17, wherein the motor has a longitudinal axis that is coaxial with the longitudinal axis of the cylindrical brush.

19. The device according to claim 13, wherein the cylindrical brush is located in front of the roller relative to the working direction of the device.

* * * * *